United States Patent [19]

Kemshall et al.

[11] Patent Number: 5,542,490
[45] Date of Patent: Aug. 6, 1996

[54] OPTO-SENSOR STEERING SYSTEM FOR FORKLIFT TRUCK

[75] Inventors: Paul A. Kemshall, Hants; Alan R. Sewell, Basingstoke, both of England

[73] Assignee: Crown Equipment Corporation, Inc., New Bremen, Ohio

[21] Appl. No.: 216,496

[22] Filed: Mar. 22, 1994

[30] Foreign Application Priority Data

Mar. 22, 1993 [GB] Great Britain ................ 9305872

[51] Int. Cl.⁶ ........................................ B62D 5/07
[52] U.S. Cl. ................ 180/422; 60/431; 91/516
[58] Field of Search ............. 180/132, DIG. 5; 60/431; 91/516

[56] References Cited

U.S. PATENT DOCUMENTS

| | | | |
|---|---|---|---|
| 3,875,747 | 4/1975 | Briggs | 60/420 |
| 3,939,938 | 2/1976 | Inoue | 91/380 |
| 4,184,333 | 1/1980 | Blaha et al. | 60/420 |
| 4,512,367 | 4/1985 | Abe et al. | 180/132 X |
| 4,537,029 | 7/1985 | Gunda et al. | 60/390 |
| 4,557,343 | 10/1985 | Pickering | 180/142 |
| 4,573,319 | 3/1986 | Chichester | 60/422 |
| 4,665,695 | 5/1987 | Rav et al. | 180/132 X |
| 4,759,182 | 7/1988 | Haarstad | 180/132 X |
| 5,201,380 | 4/1993 | Callahan | 180/132 |

*Primary Examiner*—Eric D. Culbreth
*Assistant Examiner*—Victor E. Johnson
*Attorney, Agent, or Firm*—Thompson Hine & Flory P.L.L.

[57] ABSTRACT

An electric forklift truck having a single motor which drives a pump which provides, via a priority valve, hydraulic fluid for both the working hydraulics and a steer unit on the truck. The motor is driven continuously at an idle speed in order to generate in the steer unit a dynamic load sensing signal to control the position of the priority valve. An optical sensor is associated with the steering column in order to provide an electric control signal to the motor controller to step up the speed of the motor in response to a steering demand.

17 Claims, 1 Drawing Sheet

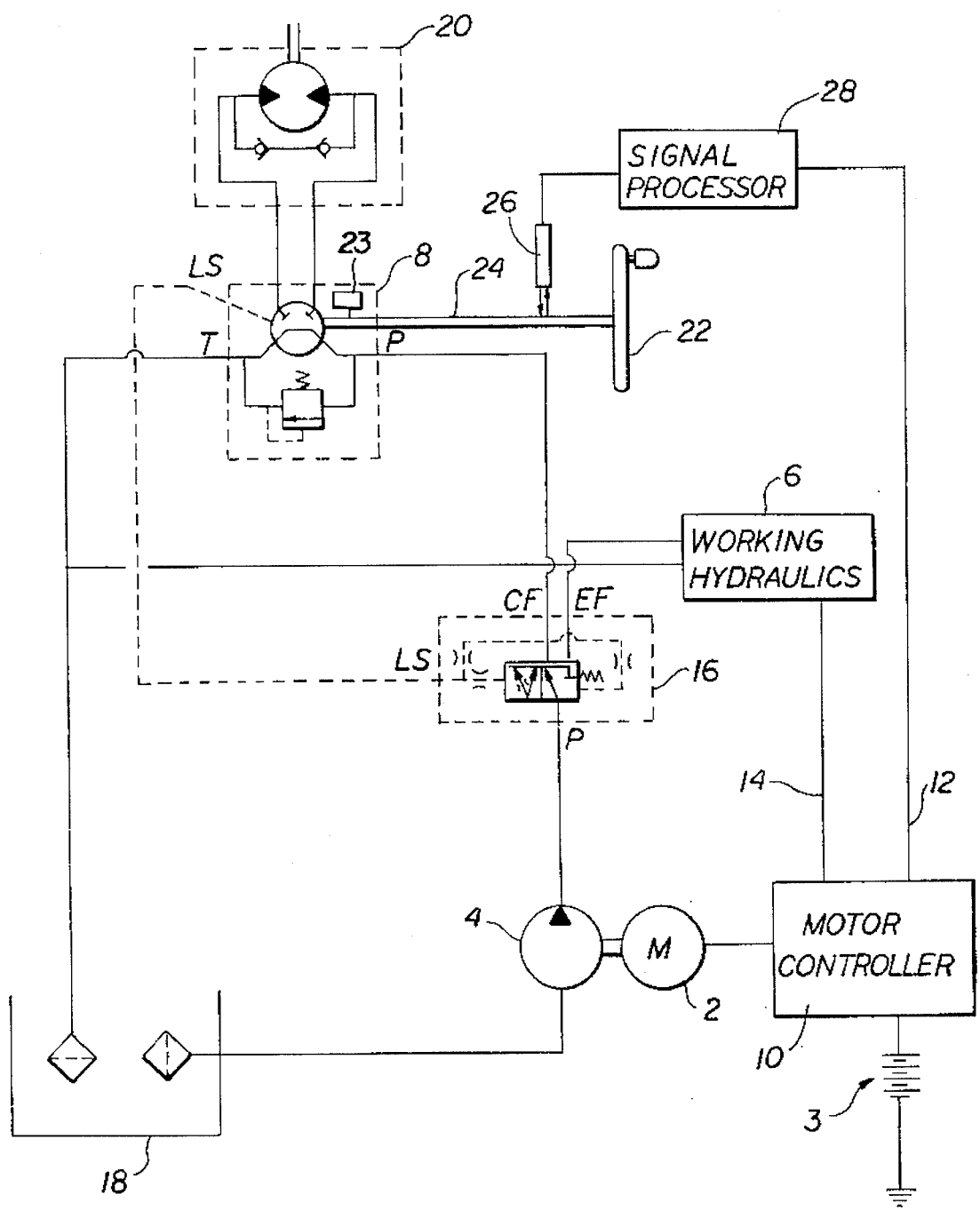

OPTO-SENSOR STEERING SYSTEM FOR FORKLIFT TRUCK

BACKGROUND OF THE INVENTION

The present invention relates to steering systems for forklift trucks and, more particularly, to a steering system in which an optical sensor is positioned adjacent the steering column to detect a steering demand and signal the hydraulic pump motor to increase speed in response to the demand.

In order to ensure that the steering motor always has a sufficient supply of hydraulic fluid when there is a steering demand, it is usual to use a priority valve. Priority valves suitable for use with standard load sensing steering systems have been manufactured by suppliers such as Danfoss (OLS series). These valves are variable priority distribution valves with a single inlet P from the pump and two outlets, CF which supplies a steer unit and EF which supplies the working hydraulics. At low pump flow, all of the pump flow is directed to the CF output, and at higher pump flow a priority flow sufficient to drive the steering is directed to the CF output with the remaining flow being directed to the EF output. The position of the valve is typically controlled by a load sensing (LS) signal derived from the steer unit.

Unless the pump is always run at a sufficient speed to generate at least the flow and pressure required for operation of the steer unit, which is clearly an inefficient option, it is also necessary to speed up or start the motor in response to the initiation of a steering demand, in order to ensure that sufficient hydraulic flow and pressure can be provided to the steer unit. It is standard practice to use a pulse control unit as a motor controller in order to vary the speed of the motor, and therefore of the pump, in order to control its output. In European Patent No. 0251290 (Still GmbH), it is proposed to use the load sensing signal from the steer unit to convert into an electrical signal to input to the motor controller in addition to the usual demand signals from the working hydraulics.

In order to convert a pressure signal to an electrical signal, it is necessary to use a device such as a pressure switch. Such pressure switches can be unreliable and are relatively expensive. Moreover, it is necessary to set a pressure switch to a predetermined level which will prevent the motor being activated unnecessarily, while ensuring that response to an actual steering need is as rapid as possible which is essential particularly in emergency situations.

In most systems which use a single motor and pump for both working and steering hydraulics, it is usual for the motor to be stationary when there is no demand for working fluid from either system. Such arrangements are described in U.K. Patent No. 1565639 (Towmotor) and European Patent No. 0283803 (Steinbock Boss). This can create significant steering response problems when steering demand occurs when the motor is stationary. A significant time delay can occur after rotation of a steering wheel while the pressure in a static load sensing line increases to a sufficient value to activate the pressure switch, and thereby control the motor so that it is switched on. Such delays can be unacceptable in emergency situations.

Accordingly, there is a need for a steering system that provides rapid steering response to a steering demand, yet is more efficient than continuously operating the pump motor at a speed sufficient to meet a demand.

SUMMARY OF THE INVENTION

The present invention is an Opto-Sensor Steering System which solves the technical problem of steering response by using a dynamic load sensing signal which controls the priority valve, together with a sensor which detects movement of a steering wheel and provides an electrical motor control signal to indicate a steering demand. Various types of movement sensors may be employed, but an optical sensor associated with the steering column is preferred for reliability and economy.

In a preferred embodiment, the pump motor is kept running at a low tick-over speed in order to direct a small pilot supply of hydraulic fluid to the LS line of an orbital steer unit at all times, so there will always be pressure in the load sensing line which will immediately increase to actuate the priority valve even when there is no demand from the working hydraulics. Where the working hydraulics use a proportional valve to control the flow to the various working components, this may also utilize the same pilot flow.

The advantages of this system are that the use of an optical sensor, which is preferably directly associated with the steering column, means that response at the motor can be more immediate as it is not dependent on any specific minimum angular rotation of the steering wheel to cause a pressure build up to a predetermined level as required to activate the pressure switch in the prior art systems referred to above.

Other objects and advantages of the present invention will be apparent from the following description, the accompanying drawing and the appended claims.

BRIEF DESCRIPTION OF THE DRAWING

The drawing illustrates a steering control system for an electrically powered forklift truck in accordance with the present invention.

DETAILED DESCRIPTION

As shown in the drawing, a motor 2 powered by a battery 3 drives a pump 4 which provides the hydraulic fluid for both the working hydraulics 6 and an orbital steer unit 8. A separate motor (not shown) is used to provide the traction for the truck and is not discussed in any further detail.

A MOSFET or other suitable motor controller 10 controls the operational speed of the motor 2. In use, the motor is always driven at an idle speed of, for example, 300 rpm when the truck is in use. The motor controller provides for a stepped or ramped increase in speed in dependence upon steering demand as indicated by a control line 12 and demand from the working hydraulics 6 as indicated by control line 14. A step increase to 500 rpm is typically required to satisfy steering demand.

Hydraulic fluid is fed to the working hydraulics via a proportional valve (not shown) which is controlled in a known manner by the truck's controls which may also be used to generate the demand signal on line 14.

The output line P from the pump 4 is fed by a dynamic load sensing priority flow divider 16 to the input of the orbital steer unit 8. The priority flow divider is of conventional design and provides a CF output connected to the orbital steer unit and an EF output connected to the working hydraulics 6. The position of the flow divider is controlled by a dynamic load sensing signal on output line LS from the orbital steer unit 8. Since there will always be a small idle flow routed through the orbital steer unit, even when there is no steering demand, there will always be a pressure in the line LS. This pressure will increase as soon as a steering demand is placed on the system. A tank output T from the orbital steer unit 8 is connected to a hydraulic reservoir tank 18 where the fluid is filtered before passing back to the pump 4.

The orbital steer unit 8 is connected to a steer motor 20 and also to a steering wheel 22. The steer unit 8 is essentially conventional except in that it is used here in a dynamic LS arrangement. However, in order to reduce the force required to steer the truck, the steering unit is provided with low torque centering springs 23. The steering wheel 22 is connected to the steer unit 8 by means of a steering column 24.

Since the idle flow of hydraulic fluid through the orbital steer unit (typically 4.8 liters per minute for a 16 cc pump and preferably in the range 1.5 to 6.0 liters per minute) is insufficient to provide for the full demand of the steering motor 20, it is necessary to increase the speed of the motor 2 in order to supply sufficient hydraulic fluid for effective steering. This is achieved by the use of a control signal on line 12 generated by an optical rotation sensor 26. The optical rotation sensor 26 is associated with the steering column 24. Adjacent the sensor 26, the steering column 24 is engraved with a series of alternating reflective and non-reflective markings in the manner of a bar code. The optical sensor 26 is a reflective sensor containing a matched infrared emitting diode and an NPN silicon phototransistor encased side by side. Optical sensors of this type are commercially available. For example, a suitable reflective sensor is manufactured by Honeywell under the reference number HOA1405.

The sensor 26 is preferably mounted in a two part housing which can be non-rotatably secured like a caliper around a fixed sleeve which surrounds the steering column 24, so as to maintain the spacing between the diode, transistor and the bar code reflecting surface at the optimum. The mounting housing is fixed so that the sensor can 'view' the bar code on the steering column through a suitable aperture in the sleeve which protects the steering column. A two-part housing in which each part is in the form of a semicircle also facilitates removal of the sensor for maintenance and provides protection for the bar code surfaces from the ingress of light (particularly fluorescent light that could cause false triggering of the sensor), dirt and grease which could affect the reflective properties of the markings. As an alternative to engraving the bar code onto the steering column directly, it would also be possible to apply a suitable reflective patch in the form of an adhesive label. Engraving is preferred as being more permanent. A single reflective patch on the steering column would suffice, but in order to achieve a standard response whatever the starting position of the steering column, a bar code which extends all the way around the steering column is preferred.

The output signal from the optical sensor 26 is fed to a signal processor 28 where it is processed to detect movement of the steering column. When the steering column is stationary, the output from the sensor 26 will be either on or off. As soon as movement occurs, there will be a step change in the output which will be repeated so long as movement is taking place and the reflective markings continue to pass beneath the sensor. By the use of appropriate electronics in the signal processor 28, it is possible to detect any step change in the output of the sensor which can then be used to provide a control signal to step up the speed of the motor, so as to ensure that there is sufficient flow on line P to satisfy the demands of the working hydraulics and the steer unit. The motor can be kept at the increased speed while movement continues to be detected, and for a predetermined interval after the steering column has become stationary again. By locating the signal processor 28 relatively close to the sensor 26, the varying signal can be at least pre-processed, so that it is less likely to be subject to interference from external sources as it passes on line 12 to the motor controller 10. The signal may be further processed within the motor controller if necessary.

It will be appreciated that the optical sensor described is only one example of a suitable movement sensor for producing an electrical output in response to a movement of the steering wheel. Other known sensors working, for example, on optical, magnetic or electromagnetic principles including reluctance, capacitance and impedance sensors may be used without departing from the scope of the invention.

With the system described, it is possible to create a steering response which is similar to or better than the response obtained in systems where a separate motor and pump is dedicated to the steering system. Although maximum efficiency is obtained by bringing the motor to a complete halt when there is no steering demand, this is at a considerable cost in response. The present invention provides good efficiency levels without compromising response in any way. This system is also particularly efficient when used in conjunction with a working hydraulics system that also requires a pilot flow for operation of its proportional valve.

While the form of apparatus herein described constitutes a preferred embodiment of the invention, it is to be understood that the invention is not limited to this precise form of apparatus, and that changes may be made therein without departing from the scope of the invention.

What is claimed is:

1. A steering system for a forklift truck comprising:

a steering circuit;

an orbital steer unit having means for generating a dynamic load sensing signal;

means for maintaining a continuous idle flow of fluid through said orbital steer unit and said signal generating means;

a detector for detecting a steering demand, said detector including an optical sensor; and means for increasing said flow of fluid in response to said steering demand, wherein said maintaining means includes a load-sensing priority valve connecting said pump to said steer unit, said valve being controlled by said signal generating means; and said means for maintaining an idle flow maintains said idle flow of said fluid even when no steering demand is detected.

2. The system of claim 1 wherein said maintaining means includes a motor; a pump driven by said motor; and a priority valve connecting said pump to said steer unit, wherein said idle flow generates a load sensing signal to control said valve.

3. The system of claim 2 wherein said steer unit includes a steering wheel having a steering column connected to said unit; and said detecting means includes a sensor disposed adjacent to said column.

4. The system of claim 3 wherein said sensor detects rotation of said steering column and outputs a signal in response to said rotation.

5. The system of claim 4 wherein said column includes a plurality of markings, and said sensor is disposed adjacent to said markings.

6. The system of claim 5 wherein said sensor includes a light source and detector, and said markings include a series of alternating reflective and non-reflective markings which pass adjacent to said sensor when said column is rotated.

7. The system of claim 6 further comprising controller means connected between said sensor and said motor for controlling motor speed in response to said sensor signal.

8. The system of claim 7 including means for processing said sensor signal to detect rotation of said wheel, and outputting a control signal to said controller means to increase motor speed in response to said rotation.

9. The system of claim 8 wherein said steer unit includes low torque centering means.

10. The system of claim 9 wherein said idle flow or fluid through said steer unit ranges between 1.5 and 6.0 liters per minute.

11. The system of claim 10 wherein said motor is operated at a speed of 300 rpm to maintain an idle flow of fluid to said steer unit.

12. The system of claim 11 wherein said motor speed is increased from 300 rpm to 500 rpm in response to said steering demand.

13. A steering system for a forklift truck comprising;

a motor;

a pump driven by said motor which provides an idle flow of fluid;

an orbital steer unit;

a priority valve interconnecting said steer unit and said pump for receiving said idle flow, said priority valve being movable between various positions;

working hydraulics;

said orbital steer unit including means for outputting a dynamic load sensing signal for controlling the position of said priority valve, and said priority valve including a detector for detecting said dynamic load sensing signal and adjusting the position of said valve in response thereto, said priority valve being connected to said working hydraulics for said truck;

a steering wheel;

a steering column connecting said steering wheel to said steer unit;

a plurality of markings located on said column;

an optical sensor disposed adjacent to said column for detecting movement of said markings, said sensor generating a signal upon detecting said movement;

a processor connected to said processor for receiving and processing said sensor signal, said processor including means for outputting a control signal; and a controller connected to said processor for receiving said control signal, said controller including an adjuster for adjusting speed of said motor in response to said control signal, such that said motor drives said pump to supply a sufficient amount of said fluid to said steer unit to meet a steering demand from said steering wheel for proper operation of said steer unit.

14. The steering system of claim 13 wherein said markings include a series of alternating reflective and non-reflective bars.

15. The steering system of claim 14 wherein said sensor includes a light source and a detector arranged adjacent to said reflective markings on said steering column.

16. The steering system of claim 15 wherein said markings are engraved on said steering column.

17. The steering system of claim 16 wherein said markings are applied to said steering column by an adhesive label.

\* \* \* \* \*

UNITED STATES PATENT AND TRADEMARK OFFICE
CERTIFICATE OF CORRECTION

PATENT NO. : 5,542,490
DATED : August 6, 1996
INVENTOR(S) : Paul A. Kemshall et al.

It is certified that error appears in the above-indentified patent and that said Letters Patent is hereby corrected as shown below:

Col. 4, lines 49-53
Claim 2 should read as follows:

2. The system of claim 1 wherein the maintaining means includes a motor; and a pump driven by said motor[; and a priority valve connecting said pump to said steer unit], wherein said idle flow [generates] ensures a load sensing signal to control said valve.

In claim 10, col. 5, line 10, "or" should be --of--.

Signed and Sealed this

Nineteenth Day of November, 1996

Attest:

BRUCE LEHMAN

Attesting Officer

Commissioner of Patents and Trademarks